No. 648,953. Patented May 8, 1900.
J. H. HANSON.
AUTOMATIC STOCK WATERING APPARATUS.
(Application filed Dec. 23, 1899.)
(No Model.)
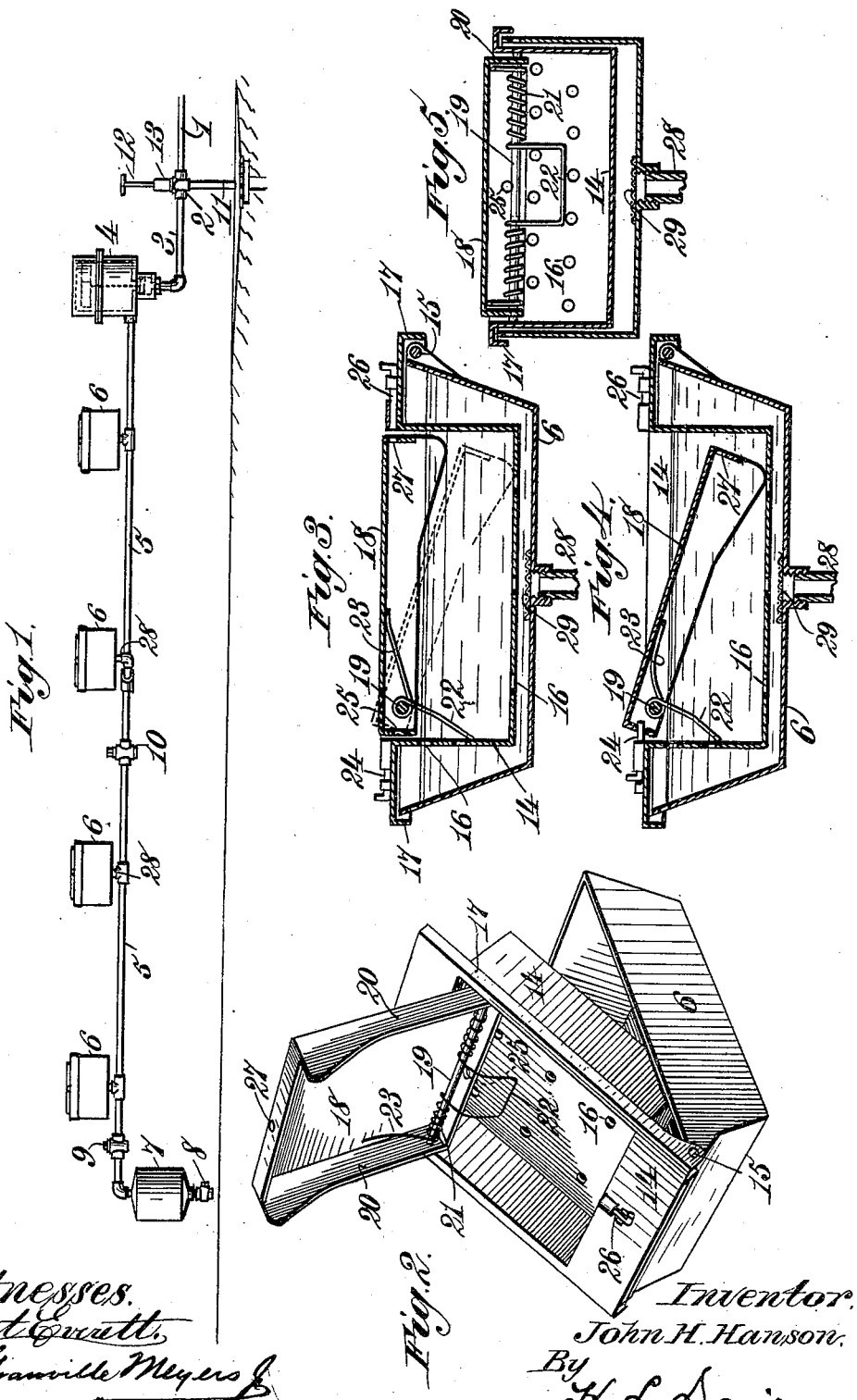
Witnesses.
Robert Everett,
J. Granville Meyers
Inventor.
John H. Hanson.
By H. L. Davis, Atty

UNITED STATES PATENT OFFICE.

JOHN H. HANSON, OF OAKLAND, NEBRASKA.

AUTOMATIC STOCK-WATERING APPARATUS.

SPECIFICATION forming part of Letters Patent No. 648,953, dated May 8, 1900.

Application filed December 23, 1899. Serial No. 741,360. (No model.)

*To all whom it may concern:*

Be it known that I, JOHN H. HANSON, a citizen of the United States, residing at Oakland, in the county of Burt and State of Nebraska, have invented certain new and useful Improvements in Automatic Stock-Watering Apparatus; and I do hereby declare the following to be a full, clear, and exact description of the invention, such as will enable others skilled in the art to which it appertains to make and use the same.

My present invention relates to certain new and useful improvements in automatic stock-watering apparatus; and it has for its prime object to provide an apparatus of this type that will be automatic in operation, easily drained, and thoroughly clean.

It is one purpose of the invention to provide a novel form of watering-trough constructed in such manner that it can be easily and quickly cleaned and drained.

It is a further purpose of the invention to provide a watering-trough having a cover or lid normally closing the same to prevent the entrance of straw or other refuse therein which would tend to contaminate the water and render it unfit for drinking purposes.

To these and other ends the invention consists in the features of construction and combination and arrangement of parts hereinafter described in detail, and then more particularly pointed out in the claims following this description.

In order to enable others to understand, make, and employ my said invention, I will proceed to describe the same in detail, reference being had for this purpose to the accompanying drawings, wherein—

Figure 1 is a side view of my improved stock-watering system, showing several troughs in position for use within a barn or like structure. Fig. 2 is a perspective view of one of my improved troughs, showing the hinged tray and lid or cover partially lifted. Figs. 3 and 4 are longitudinal sectional views of the trough, and Fig. 5 is a transverse sectional view of the same.

Referring now to the drawings, and particularly to Fig. 1, I have shown a plurality of watering-troughs in the position they would assume when placed in the different stalls to be supplied with water, all of said troughs being connected and supplied from a common water-main, which may receive its supply of water from a tank or other source.

The reference-numeral 1 designates the water-supply pipe, which is preferably located underground and controlled by a three-way cock 2. From said cock 2 a pipe 3 leads to a water-chamber 4, the entrance of water in which is controlled by a float-valve such as shown and described in my copending application, Serial No. 741,090, filed December 21, 1899, although any other suitable form of automatic valve may be employed, if desired. Leading from the water-chamber 4 is a pipe 5, which may extend into a barn or other place to be supplied, and attached to said pipe are a series of watering-troughs 6 of novel construction. At the end of this pipe I attach a sediment vessel 7 to catch and retain any substance that may pass through the supply-pipe, said sediment vessel being provided with a draw-off cock 8, as shown. I also provide a cock 9 to close off communication with the sediment vessel and another cock 10 in the supply-pipe 5, whereby some of the troughs may be put out of service when desired. Leading from the three-way cock 2 is a drain-pipe 11, which may extend to a cesspool or other suitable place, said drain-pipe operating, when the three-way cock is turned to communicate therewith, to drain the water from the several troughs and also from the water-chamber and conduct the same away to the cesspool. This operation is desirable in extremely-cold weather in order to drain the troughs and pipes to prevent freezing. The three-way cock is operated by a suitable wrench or rod 12, which may be guided to its operative position by means of a pipe sunk into the ground. It will now be seen that if the three-way cock is opened to communicate with the pipes 1 and 3 water will flow through said pipes into the water-chamber, from whence it will enter the several troughs, the height of water in said troughs being regulated and controlled by the float-valve in the water-chamber, said float-valve acting at all times to keep the water in the troughs at a certain predetermined level, as is well understood. If now it is desired to drain the troughs and pipes, it is simply necessary to turn the three-way cock so that the side port therein will communicate with the drain-pipe 11, closing off the supply-pipe or water-main, and the water in said troughs will then flow back and out through said drain-pipe.

I will now proceed with a detailed description of my improved watering-trough heretofore alluded to and which I consider to be of novel construction. These troughs each comprise a main vessel or receptacle 6, having a supplementary vessel 14 hinged thereto at one side, as at 15, said supplementary vessel being arranged to enter and rest within the main vessel and is provided with a plurality of perforations 16 in its bottom and also in the rear or hinged side, as shown, to admit water from the main vessel to pass into the same. This supplemental vessel 14 is also provided around its sides and ends with depending flanges 17, which serve to prevent the entrance of straw or other refuse into the main vessel. In order to prevent the entrance of straw and the like into the supplemental vessel 14, I provide a yielding cover 18 for the same, said cover being pivoted or hinged at one end to a rod 19, which passes through the supplementary vessel 14 and through the sides 20 of the cover 18. This cover is yieldingly supported by means of a spring-wire coiled at two points 21 about the rod 19 and formed intermediate said coils with a downwardly-extending loop 22, which bears upon the rear inner side of the supplemental vessel 14, and the ends 23 of said spring extend outward or forward and act under tension upon the under side of the cover 18, so as to yieldingly support the same in a horizontal position over the body of water in the trough. To reach the water, the cover 18 is depressed by the nose of the animal until the water rises above it, as seen in Fig. 4, and when the pressure is removed the spring will return the cover to its horizontal position, securely closing the trough against litter. On the top of the supplemental vessel 14, adjacent to the hinged end of the cover, is a sliding bolt 24, one end of which is provided with a suitable handle, said bolt being arranged to enter an opening 25 in the end flange of said cover when the forward end of the latter is depressed, thus locking the same in such depressed position, as clearly shown in Fig. 4, in order to expose the water above the same. This means for holding the cover depressed is employed for teaching the animal to use the trough, for when he has once found that water lies below the cover he will soon learn to depress the latter when water is desired. A similar bolt 26 is placed at the opposite end of the cover, which may be caused to enter an opening 27 in the front flange of the cover, and by this means the said cover can be retained in its horizontal position above the water to prevent the animal from obtaining water when he is too warm.

In order to clean the trough, the supplemental vessel 14 is lifted and turned quickly over on its hinges in an inverted position, at the same time opening or raising the cover, and the water and other contents will flow out. The main trough 6 can then be wiped out and cleaned as desired and the supplemental vessel returned to its place.

The troughs are each connected to the main supply-pipe 5 by a branch 28, which may enter either the bottom or side of the trough, as desired, the pipe-opening being covered by a screen 29 to prevent the entrance of solid impurities into the trough.

In practice the water will be turned on at such times as it is needed and the state or condition of the weather will permit until the troughs are all filled and then turned off, particularly during extremely-cold or freezing weather.

Minor changes or additions may be made without departing from the spirit of my invention.

What I claim is—

1. In a stock-watering system, the combination with a main supply-pipe, of a three-way cock controlling the flow of water through said pipe, a drain-pipe leading from said cock, a water-chamber communicating by a pipe with the cock, a float-valve controlling the entrance of water into said chamber, a service-pipe leading from the chamber, a watering trough or troughs communicating with the service-pipe, and a sediment vessel at the end of the service-pipe, substantially as described.

2. A watering-trough comprising a main vessel, and supplemental vessel having a bottom, side and end walls, said supplemental vessel being hinged to one side of the main vessel and normally nesting therein, but adapted to be swung out to an inverted position, and provided with water-inlet openings to receive water from the main vessel, substantially as described.

3. In a watering-trough, the combination with a main vessel, of a supplemental vessel hinged thereto and adapted to nest therein, said supplemental vessel being provided with water-inlet openings, and a cover hinged to the supplemental vessel and adapted to be depressed within the same, substantially as described.

4. In a watering-trough, the combination with a main vessel, of a supplemental vessel hinged thereto and normally resting within the same, said supplemental vessel being provided with water-inlet openings, and a yieldingly-supported cover carried by the supplemental vessel and adapted to be depressed therein, substantially as described.

5. In a watering-trough, the combination with a main vessel, of a supplemental vessel hinged thereto and normally resting within the same, said supplemental vessel being provided with water-inlet openings, a cover hinged to the supplemental vessel and adapted to be depressed within the latter, and a spring acting upon the under side of the cover to normally hold the same in a horizontal position, substantially as described.

6. In a watering-trough, the combination with a main vessel, of a supplemental vessel hinged to the main vessel and provided around its edges with depending flanges which lie over the edges of the main vessel when the parts are in position, said supplemental vessel being provided with water-inlet openings, substantially as described.

7. In a watering-trough, the combination with a main vessel, of a supplemental vessel resting therein, a cover hinged to the supplemental vessel and adapted to be depressed therein, and means for locking the cover depressed, substantially as described.

8. A watering-trough having a movable cover adapted to be depressed within the trough, and means for locking the cover depressed, substantially as described.

9. A watering-trough having a cover hinged thereto adapted to be depressed within the trough, and means for locking the cover depressed, substantially as described.

10. A watering-trough having a yielding cover hinged thereto and adapted to be depressed within the trough, and a bolt for locking the cover depressed, substantially as described.

11. A watering-trough having a depressible cover normally lying in a horizontal plane within the trough, and means for locking the cover against movement, when in its depressed and horizontal positions, substantially as described.

12. A watering-trough having a yielding cover hinged thereto and adapted to be depressed within the trough, said cover normally lying in a horizontal plane, and means for locking said cover against movement, substantially as described.

13. In a watering-trough, the combination with a main vessel, of a supplemental vessel hinged thereto and normally lying within the same, a yielding cover hinged to said supplemental vessel and adapted to be depressed therein, and bolts for locking the cover, substantially as described.

14. In a watering-trough, the combination with a main vessel, of a supplemental vessel hinged thereto at one end and normally resting within the same, said supplemental vessel being provided with water-inlet openings, a yielding cover hinged at one end to the last-named vessel, a spring for normally holding the cover in a horizontal position, and locking-bolts for the cover, substantially as described.

In testimony whereof I affix my signature in presence of two witnesses.

JOHN H. HANSON.

Witnesses:
VICTOR L. FRIED,
JOHN J. MCCOURT.